Patented Nov. 18, 1941

2,263,447

UNITED STATES PATENT OFFICE 2,263,447

LATENT CATALYSTS FOR ACID-CURING THERMOSETTING RESINS

Norman A. Shepard, Stamford, Conn., assignor to American Cyanamid Company, New York, N. Y., a corporation of Maine No Drawing. Application July 4, 1939, Serial No. 282,815

7 Claims. (Cl. 260—71)

This invention relates to substantially stable compositions containing acid-curing thermosetting resins, and is especially directed to such compositions which include suitable curing catalysts.

Most of the catalysts which have previously been proposed for use with acid-curing thermosetting resins cause such resins to partially or wholly cure at relatively low temperatures. If compositions containing such catalysts, together with an uncured acid-curing thermosetting resin be stored, the resin may be partially or wholly cured even at normal temperatures. This results in the case of molding powders in a loss of proper flow characteristics and, therefore, in loss of utility for most purposes. Furthermore, if it be desirable to subject the composition containing the resin and catalyst to preliminary mild heat without curing as may be necessary in many operations, such as textile treating, then it is preferable to use a curing catalyst which is relatively inactive at low temperatures but which will cure the resin readily at somewhat higher temperatures.

One object of this invention is to provide catalysts or accelerators for acid-curing thermosetting resins which will cure such resins rapidly only at relatively high temperatures. Another object of this invention is to provide catalysts which will not cure resinous molding compositions appreciably at room temperatures.

These and other objects are attained by employing as a catalyst a compound having the formula:

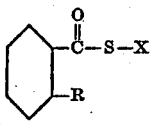

wherein R is hydrogen, —COOH, or

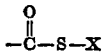

and where X is a carbocyclic or heterocyclic radical.

The following examples of my invention are given by way of illustration and not in limitation.

Example 1

| | Parts by weight |
|---|---|
| Bleached sulfite wood pulp | 37 |
| Urea-formaldehyde resin (dry basis) | 63 |
| Zinc stearate | 0.5 |
| Benzoyl mercaptobenzothiazole | 0.8 |

The pulp is impregnated with an aqueous urea-formaldehyde resin syrup and dried in the usual manner preferably below about 100° C. The zinc stearate may be added as a mold lubricant and the mixture ground in a ball mill or other suitable apparatus. The benzoyl mercaptobenzothiazole is added during the grinding to form a molding composition which is substantially stable during storage. This composition may be molded at about 135–165° C., preferably at about 150° C., conveniently at about 3000–5000 pounds per square inch and for a period of several minutes. The resulting molded article has good water resistance and is cured.

Phthaloylmercaptobenzothiazole may be substituted for the benzoyl derivative in Example 1 with similar results.

Example 2

To a urea-formaldehyde resin molding composition about 0.1%–0.5% of thio beta naphthyl benzoate is added and the mixture is ground in a ball mill or other suitable apparatus for about twelve hours. The resulting composition may be molded at about 135–165° C., preferably at about 150° C. and cured for about two to three minutes. A pressure of about 3000–5000 pounds per square inch is generally suitable for this molding operation. The resulting molded article is resistant to moisture. The uncured molding powder containing the catalyst is quite stable upon storage at normal temperatures.

Other acid-curing thermosetting resins may be substituted for all or part of the urea-formaldehyde resin employed in Examples 1 and 2. The term "acid-curing thermosetting resin" includes those resins which may be cured only under acid conditions and also those which may be cured under either acid or alkaline conditions. Such resins include those obtained by reacting an aldehyde, e. g., formaldehyde, acetaldehyde, benzaldehyde, etc. with one or more of the following: thiourea, the reaction products obtained by heating and decomposing dicyandiamide, melamine, other aminotriazines, phenol, other phenols such as the alkyl phenols, etc. Mixed resins, e. g. urea-melamine-formaldehyde, urea-thiourea-formaldehyde resins, etc. may be prepared by reacting the aldehyde with each of the other reactants separately or the aldehyde may be reacted with a mixture of the other reactants. Mixed resins containing from about 20%–60% of melamine-formaldehyde resin and the remainder urea-formaldehyde resin are especially suitable.

Usually only a small portion of catalyst is necessary to produce rapid cures, e. g. about 0.1%–1%. In some cases it may be desirable to use up to about 2%–3% of catalyst, and even considerably greater quantities of catalyst may be used without causing substantial pre-curing during storage or the like.

Catalysts which are derived from aromatic acids such as phthalic acid and benzoic acid are especially suitable for the purposes of my invention. If phthalic acid derivatives be employed, the compound may be either a mono or di derivative thereof. Aromatic acid derivatives of mercaptobenzothiazole have been found to be particularly suitable. Obviously various mixtures of the catalysts described herein may be used.

Various fillers e. g. wood flour, cotton linters, clay, etc. may be used in place of or in addition to cellulose pulp included in the compositions of Examples 1 and 2. Furthermore, coloring materials may be included if desired. In some applications it may be desirable to add modifying agents such as starches, gums, alginates, casein, etc. Plasticising agents, e. g. toluene-sulfonamides, alkyd resins, polyhydric alcohols, etc. may be incorporated in the compositions.

The catalysts which I have described may be employed in molding powders or in solid compositions which have been prepared for hot pressing into sheets, rods, bars, or other units, as well as in compatible resin syrups for use in impregnating, laminating, adhesives, etc. They may also be used in compatible coating compositions containing acid curing thermo-setting resins.

Obviously many modifications and variations in the processes and compositions described above may be made without departing from the spirit and scope of the invention as defined in the appended claims.

1. A composition which is substantially stable at normal temperatures comprising an acid-curing thermosetting resin and a latent curing catalyst of the formula:

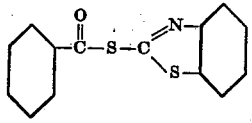

2. A composition which is substantially stable at normal temperatures comprising an acid-curing thermosetting resin and a latent curing catalyst of the formula:

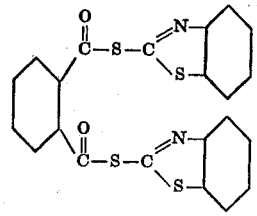

3. A composition which is substantially stable at normal temperatures comprising an acid curing thermosetting resin and a latent curing catalyst selected from the group consisting of benzoyl- and phthaloyl-mercaptobenzothiazoles.

4. A composition which is substantially stable at normal temperatures comprising a urea-formaldehyde resin and a latent curing catalyst selected from the group consisting of benzoyl- and phthaloyl-mercaptobenzothiazoles.

5. A composition which is substantially stable at normal temperatures comprising a melamine-formaldehyde resin and a latent curing catalyst selected from the group consisting of benzoyl- and phthaloyl-mercaptobenzothiazoles.

6. A composition which is substantially stable at normal temperatures comprising a melamine-urea-formaldehyde resin and a latent curing catalyst selected from the group consisting of benzoyl- and phthaloyl-mercaptobenzothiazoles.

7. A process which comprises adding a latent curing catalyst selected from the group consisting of benzoyl- and phthaloyl-mercaptobenzothiazoles to an acid curing thermosetting resin and subjecting the mixture to a polymerizing temperature above about 135° C.

NORMAN A. SHEPARD.